United States Patent
Hostetler et al.

(10) Patent No.: US 11,494,626 B2
(45) Date of Patent: Nov. 8, 2022

(54) RUNTIME-THROTTLEABLE NEURAL NETWORKS

(71) Applicant: SRI International, Menlo Park, CA (US)

(72) Inventors: Jesse Hostetler, Princeton, NJ (US); Sek Meng Chai, Princeton, NJ (US)

(73) Assignee: SRI INTERNATIONAL, Menlo Park, CA (US)

( * ) Notice: Subject to any disclaimer, the term of this patent is extended or adjusted under 35 U.S.C. 154(b) by 498 days.

(21) Appl. No.: 16/600,154

(22) Filed: Oct. 11, 2019

(65) Prior Publication Data

US 2020/0193279 A1    Jun. 18, 2020

Related U.S. Application Data

(60) Provisional application No. 62/779,322, filed on Dec. 13, 2018.

(51) Int. Cl.
  *G06N 3/04*      (2006.01)
  *G06N 3/063*     (2006.01)
  (Continued)

(52) U.S. Cl.
  CPC .......... *G06N 3/063* (2013.01); *G06F 1/3287* (2013.01); *G06N 3/0454* (2013.01); *G06N 3/084* (2013.01); *G06N 20/20* (2019.01)

(58) Field of Classification Search
  CPC ......... G06T 1/20; G06F 1/3287; G06N 3/063; G06N 3/0454; G06N 3/084; G06N 20/20
  (Continued)

(56) References Cited

U.S. PATENT DOCUMENTS

2011/0148887 A1*  6/2011  Chong ............... G06T 1/00
                                                345/501
2012/0013627 A1*  1/2012  Shah ............... G06F 1/3203
                                                345/522
(Continued)

OTHER PUBLICATIONS

Yun et al., "Action-Decision Networks for Visual Tracking with Deep Reinforcement Learning," Proceedings of the IEEE Conference on Computer Vision and Pattern Recognition, (CVPR) 2017, Jul. 21-26, 2017, retrieved from Open Access, 10 pp.
(Continued)

*Primary Examiner* — Jacinta M Crawford
(74) *Attorney, Agent, or Firm* — Shumaker & Sieffert, P.A.

(57) ABSTRACT

In general, the disclosure describes techniques for creating runtime-throttleable neural networks (TNNs) that can adaptively balance performance and resource use in response to a control signal. For example, runtime-TNNs may be trained to be throttled via a gating scheme in which a set of disjoint components of the neural network can be individually "turned off" at runtime without significantly affecting the accuracy of NN inferences. A separate gating neural network may be trained to determine which trained components of the NN to turn off to obtain operable performance for a given level of resource use of computational, power, or other resources by the neural network. This level can then be specified by the control signal at runtime to adapt the NN to operate at the specified level and in this way balance performance and resource use for different operating conditions.

20 Claims, 10 Drawing Sheets

(51) Int. Cl.
  *G06F 1/3287* (2019.01)
  *G06N 20/20* (2019.01)
  *G06N 3/08* (2006.01)
(58) Field of Classification Search
  USPC .......................................................... 345/501
  See application file for complete search history.

(56) References Cited

U.S. PATENT DOCUMENTS

| | | | | |
|---|---|---|---|---|
| 2016/0180487 | A1* | 6/2016 | Trawczynski | G06T 1/20 345/505 |
| 2018/0307495 | A1* | 10/2018 | Ould-Ahmed-Vall | G06T 1/20 |
| 2019/0042909 | A1* | 2/2019 | Sumbul | G06N 3/08 |
| 2020/0042864 | A1* | 2/2020 | Nguyen | G06N 3/0481 |

OTHER PUBLICATIONS

Yu et al., "Slimmable Neural Networks," ICLR 2019, Cornell University, arXiv: 1812.08928v1, Dec. 21, 2018, 12 pp.

Xie et al., "Aggregated: residual transformations for deep neural networks." In IEEE Conference on Computer Vision and Pattern Recognition (CVPR), Jul. 21-26, 2017, retrieved from Open Access, 9 pp.

Wu et al., "Blockdrop: Dynamic inference paths in residual networks," In IEEE Conference on Computer Vision and Pattern Recognition (CVPR), pp. 8817-8826, accessed from Open Access, Jun. 18-22, 2018.

Wang et al., "Skipnet: Learning dynamic routing in Convolutional Networks" Cornell University, arXiv:1711.09485v1, Nov. 26, 2017, 9 pp.

Veit et al., "Residual networks behave like ensembles of relatively shallow networks," In Advances in Neural Information Processing Systems (NIPS), pp. 550-558, accessed from Cornell University, arXiv: 1605.06431, May 20, 2016.

Teerapittayaon et al. "Fast inference via early exiting from deep neural networks," In International Conference on Pattern Recognition (ICPR), IEEE, pp. 2464 2469, Dec. 4-8, 2016.

Srivastava et al., "Dropout: A simple way to prevent neural networks from overfitting," Journal of Machine Learning Research, 15(1):1929-1958, published Jun. 2014, 30 pp.

Simonyan et al., "Very deep convolutional networks for large-scale image recognition," ICLR 2015, Cornell University, arXiv:1409.1556v1, Sep. 4, 2014, 10 pp.

Shazeer et al., "Outrageously large neural networks: The sparsely-gated mixture-of-experts layer," ICLR 2017, Cornell University, arXiv:1701.06538, Jan. 23, 2017, 19 pp.

Ren et al., "Faster R-CNN: Towards Real-Time Object Detection with Region Proposal Networks," Advances in Neural Information Processing Systems 28, (NIPS 2015), Dec. 7-10, 2015, 9 pp.

Rastegari et al., "XNOR-Net: Imagenet classification using binary convolutional neural networks," In European Conference on Computer Vision (ECCV), 2016, Cornell University, arXiv:1603.05279v4, Aug. 2, 2016, 17 pp.

Pham et al., "Efficient neural architecture search via parameter sharing," Cornell University, arXiv:1802.03268, Feb. 12, 2018, 11 pp.

Parajuli et al., "Generalized Ternary Connect: End-to-End Learning and Compression of Multiplication-Free Deep Neural Networks," Cornell University, arXiv:1811.04985, Nov. 12, 2018, 8 pp.

Odena et al., "Changing Model Behavior at Test-Time Using Reinforcement Learning," ICLR 2017, Cornell University, arXiv:1702.07780v1, Feb. 24, 2017, 6 pp.

Maddison et al., "The Concrete Distribution: a Continuous Relaxation of Discrete Random Variables," ICLR 2017, Cornell University, arXiv:1611.00712v3, Mar. 5, 2017, 20 pp.

Loshchilov et al., "SGDR: Stochastic Gradient Descent With Restarts," Cornell University, arXiv:1608.03983v1, Aug. 13, 2016, 9 pp.

Lin et al., "Neural Networks With Few Multiplications," ICLR 2016, Cornell University, arXiv:1510.03009v3, Feb. 26, 2016, 9 pp.

Li et al., "Dynamic Computational Time for Visual Attention," Proceedings of the IEEE International Conference on Computer Vision (ICCV), 2017, Oct. 22-29, 2017, 11 pp.

Lee et al., "URNet : User-Resizable Residual Networks with Conditional Gating Module," Cornell University, arXiv:1901.04687v2, Apr. 12, 2019, 12 pp.

Lebedev et al., "Speeding-Up Convolutional Neural Networks Using Fine-Tuned CP-Decomposition," ICLR 2015, arXiv:1412.6553v1, Dec. 19, 2014, 10 pp.

Lane et al., "DeepX: A Software Accelerator for Low-Power Deep Learning Inference on Mobile Devices," Apr. 11-14, 2016, 12 pp.

Krizhevsky, "Learning Multiple Layers of Features from Tiny Images," Apr. 8, 2009, 60 pp.

Kingma et al., "ADAM: a Method for Stochastic Optimization," ICLR 2015, arXiv:1412.6980v9, Jan. 30, 2017, 15 pp.

Hubara et al., "Binarized Neural Networks," 30th Conference on Neural Information Processing Systems (NIPS 2016), Dec. 5-11, 2016, 9 pp.

Huang et al., "Densely Connected Convolutional Networks," 2017 IEEE Conference on Computer Vision and Pattern Recognition (CVPR), Jul. 21-26, 2017, 9 pp.

Huang et al., "Deep Networks with Stochastic Depth," In European Conference on Computer Vision, 2016, Cornell University, arXiv: 1603.09382v3, Jul. 28, 2016, 16 pp.

Howard et al., "MobileNets: Efficient Convolutional Neural Networks for Mobile Vision Applications," Cornell University, arXiv:1704.04861v1, Apr. 17, 2017, 9 pp.

Held et al., "Learning to Track at 100 FPS with Deep Regression Networks," Cornell University, arXiv:1604.01802v2, Aug. 2016, 26 pp.

He et al., "Deep Residual Learning for Image Recognition," In IEEE Conference on Computer Vision and Pattern Recognition (CVPR) 2016, Jun. 27-29, 2016, 9 pp.

Han et al., "Learning both Weights and Connections for Efficient Neural Networks," Advances in Neural Information Processing Systems 28, (NIPS 2015), Dec. 7-10, 2015, 9 pp.

Figurnov et al., "Spatially Adaptive Computation Time for Residual Networks," The IEEE Conference on Computer Vision and Pattern Recognition (CVPR), Jul. 21-26, 2017, accessed from http://openaccess.thecvf.com/content_cvpr_2017/html/Figurnov_Spatially_Adaptive_Computation_CVPR_2017_paper.html,10 pp.

Everingham et al., The PASCAL Visual Object Classes Challenge 2007 (VOC2007) Development Kit, Jun. 7, 2007, 23 pp.

Courbariaux et al., "BinaryConnect: Training Deep Neural Networks with binary weights during propagations," NIPS'15: Proceedings of the 28th International Conference on Neural Information Processing Systems, vol. 2 Dec. 2015, 9 pp.

Bengio et al., "Estimating or Propagating Gradients Through Stochastic Neurons for Conditional Computation," accessed from arXiv preprint arXiv:1308.3432, Aug. 2013, 12 pp.

Bengio et al., "Conditional Computation in Neural Networks for Faster Models," accessed from https://arxiv.org/abs/1511.06297, ICLR 2016, Nov. 2015, 12 pp.

"Tensors and Dynamic neural networks in Python with strong GPU acceleration," retrieved from https://github.com/pytorch/pytorch on Jun. 5, 2020, 10 pp.

"Convert Torch to Pytorch," retrieved from https://github.com/clcarwin/convert_torch_to_pytorch#readme on Jun. 5, 2020, 2 pp.

"A Simple and Fast Implementation of Faster R-CNN that replicate performance from origin paper," retrieved from https://github.com/chenyuntc/simple-faster-rcnn-pytorch/tree/0.3 on Jun. 5, 2020, 7 pp.

Paszke et al., "Automatic differentiation in PyTorch," 31st Conference on Neural Information Processing Systems, (NIPS 2017), https://openreview.net/pdf?id=BJJsrmfCZ , Oct. 28, 2017, 4 pp.

Russakovsky et al., "ImageNet Large Scale Visual Recognition Challenge," Cornell University, arXiv: 1409.0575v3, Jan. 30, 2015, 43 pp.

* cited by examiner

RUNTIME-THROTTLEABLE NEURAL NETWORKS

This application claims the benefit of U.S. Provisional Patent Application 62/779,322, filed Dec. 13, 2018, the entire content of which is incorporated herein by reference.

GOVERNMENT RIGHTS

This invention was made with Government support under contract N00014-17-C-1011 awarded by the Office of Naval Research. The Government has certain rights in this invention.

TECHNICAL FIELD

This disclosure generally relates to machine learning systems.

BACKGROUND

Machine learning algorithms have recently made rapid progress using artificial neural networks (ANNs). Examples of ANNs include deep neural networks (DNNs), which have multiple hidden layers between input and output layers, and convolutional neural networks (CNNs), which use convolution rather than matrix multiplication in at least one of their layers. Most practical CNNs also have at least one hidden layer and thus qualify as DNNs. ANNs have broad application in the fields of artificial intelligence, computer vision, automatic speech recognition, language translation, and so on. Training times, memory requirements, processor availability, battery power consumption, and energy efficiency remain challenges associated with ANNs.

SUMMARY

In general, the disclosure describes techniques for creating runtime-throttleable neural networks that can adaptively balance performance and resource use in response to a control signal. Throttleable neural networks allow intelligent resource management, for example by allocating fewer resources in "easy" conditions or when battery power is low. For example, runtime-throttleable neural networks may be trained to be throttled via a gating scheme in which a set of disjoint components of the neural network can be individually "turned off" at runtime without significantly affecting the accuracy of neural network inferences. A separate gating neural network may be trained to determine which trained components of the neural network to turn off to obtain operable performance for a given level of resource use of computational, power, or other resources by the neural network. This level can then be specified by the control signal at runtime to adapt the neural network to operate at the specified level and in this way balance performance and resource use for different operating conditions. Moreover, the gating neural network can be retrained without retraining the throttleable neural network.

The techniques may provide one or more technical advantages that enable at least one practical application. For example, a uniform throttleable neural network with a trained model may be deployed not only to high-performance computing system but also to resource-constrained edge computing platforms, such as mobile phones or embedded controllers, while still achieving acceptable accuracy. This adaptivity can be achieved, moreover, without modifying the network architecture or implementation (e.g., by weight quantization or substituting low-rank approximations of the weight tensors). Such modifications produce a single simplified model that occupies one point in the tradeoff space between performance and resource use. The techniques may also provide for a dynamically throttleable neural network that can adapt to changing conditions, such as low-battery conditions or changing environmental conditions. For example, a surveillance system may have lower accuracy in low-light conditions, and a runtime-throttleable neural network as described herein can "throttle up" its performance while the challenging conditions persist. Likewise, a battery-powered sensor could "throttle down" performance runtime-throttleable neural network to extend the sensor's battery life, though with some effect on performance.

The techniques may have still further advantages. For example, the techniques are largely model-agnostic and can be applied to various types of neural network architectures. Because of the focus on computational components, the techniques may also be amenable to acceleration in hardware because a gated neural network preserves most opportunities for vectorized computation that are present in the original ungated architectures. In some examples, a two-stage training approach allows the "data path" of the uniform neural network to be trained once, while a computationally simpler gating module can be trained and retrained separately. This makes the overall throttleable neural network highly adaptable. The gating module in some cases can be deployed on the edge device to which the uniform neural network is operational to accommodate a changing environment.

In one example, a computing system provides a runtime-throttleable neural network, the computing system comprising: a neural network comprising a plurality of components, each of the components comprising one or more computational elements of the neural network; a uniform neural network model having respective sets of parameters for all of the components of the neural network; a gating module having a gating function configured to select components of the neural network to deactivate based on one or more control parameters; and a computation engine comprising processing circuitry, wherein the computation engine is configured to execute the gating module to selectively deactivate, based on the one or more control parameters, by applying the gating function, one or more of the plurality of components to produce a modified neural network that includes active components of the plurality of components and does not include the deactivated components of the plurality of components to throttle an amount of resources used to perform prediction, wherein the computation engine is configured to execute, with the respective sets of parameters of the uniform neural network model for the active components, the active components of the modified neural network to process input data to generate output data for the input data, and wherein the computation engine is configured to output the output data for the input data.

In another example, a computing system for training a runtime-throttleable neural network comprises a neural network comprising a plurality of components, each of the components comprising one or more computational elements of the neural network; a uniform neural network model having respective sets of parameters for the components of the neural network; a gating module having a gating function configured to select components of the neural network to deactivate based on one or more control parameters; a computation engine comprising processing circuitry, wherein the computation engine is configured to execute the neural network to process first training data to train the uniform neural network model of the neural network over multiple first epochs, wherein for each of the first epochs the computing engine is configured to: select one or more deactivated components from the components of the neural network to produce a first modified neural network that includes active components of the plurality of components and does not include the deactivated components to throttle an amount of resources used to perform prediction; and process the first training data using the first modified neural network to train the uniform neural network model to optimize a first loss function.

In another example, a method for training a throttleable neural network comprises selecting, by a gating module having a gating function and executed by a computing system, components from a plurality of components of a neural network to deactivate based on one or more control parameters, each of the components comprising one or more computational elements of the neural network; processing, with the neural network executed by the computing system, first training data to train the uniform neural network model of the neural network over multiple first epochs, wherein the uniform neural network module has respective sets of parameters for the components of the neural network, each of the first epochs including the steps of: selecting one or more deactivated components from the components of the neural network to produce a first modified neural network that includes active components of the neural network and does not include the deactivated components to throttle an amount of resources used to perform prediction; and processing the first training data using the first modified neural network to train the uniform neural network model to optimize a first loss function.

The details of one or more examples of the techniques of this disclosure are set forth in the accompanying drawings and the description below. Other features, objects, and advantages of the techniques will be apparent from the description and drawings, and from the claims.

BRIEF DESCRIPTION OF DRAWINGS

Like reference characters refer to like elements throughout the figures and description.

DETAILED DESCRIPTION

Figure 1:
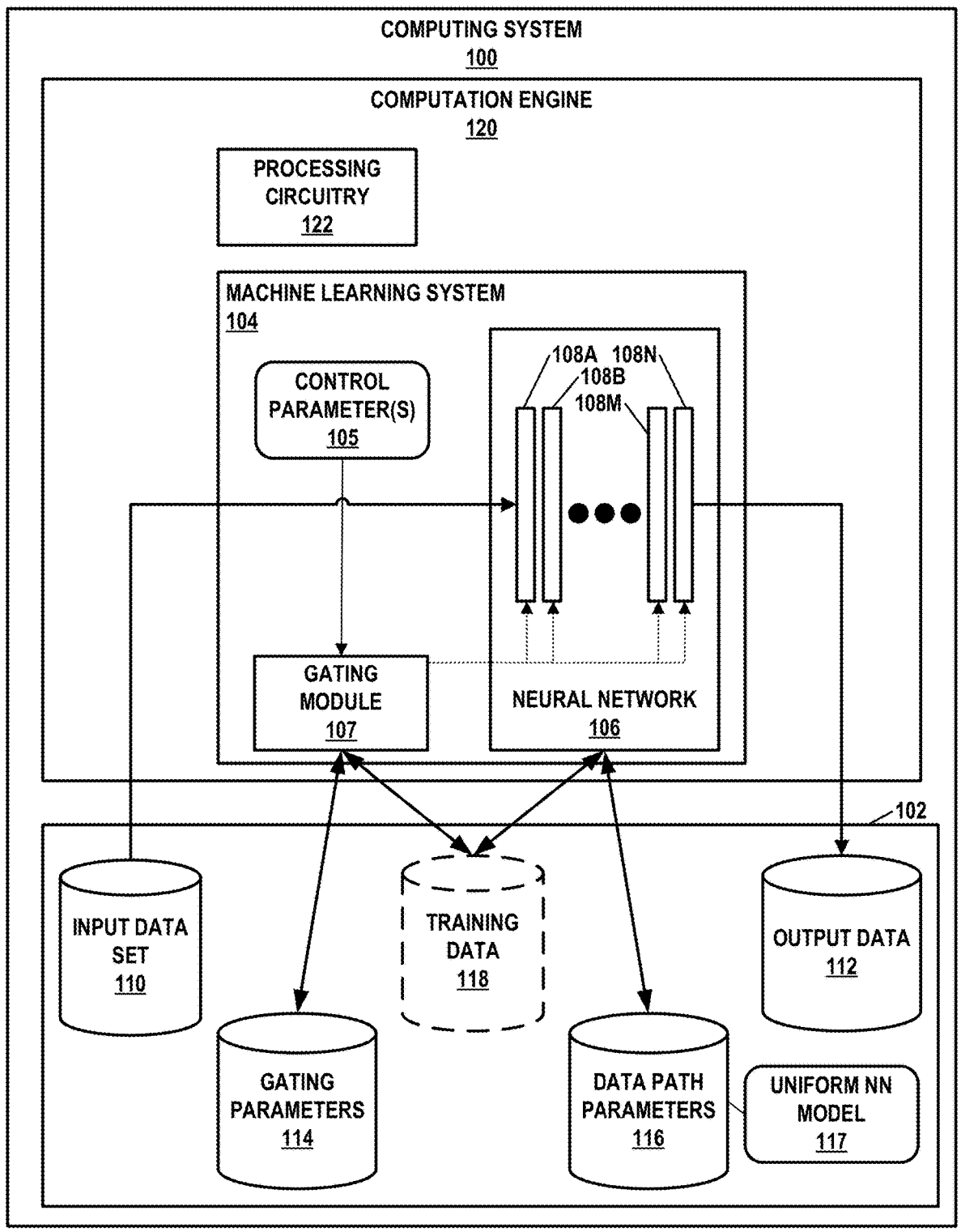
FIG. 1 is a block diagram illustrating an example computing system in accordance with the techniques of the disclosure.

FIG. 1 is a block diagram illustrating an example computing system 100, in accordance with techniques of this disclosure. As shown, computing system 100 represents one or more computing devices that make up a computation engine 120 for executing a machine learning system 104 having an artificial neural network (ANN) 106 comprising a plurality of computational elements 108A through 108N (collectively, "components 108"). ANN 106 may comprise various types of deep neural networks (DNNs), such as recursive neural networks (RNNs) and convolutional neural networks (CNNs).

Processing circuitry 122 and memory 102 may provide an operating environment or platform for computation engine 120, which may be implemented as software, but may in some examples include any combination of hardware, firmware, and software. Processing circuitry 122 may execute instructions and memory 102 may store instructions and/or data of one or more modules. The combination of processing circuitry 122 and memory 102 may retrieve, store, and/or execute the instructions and/or data of one or more applications, modules, or software. Processing circuitry 122 and memory 102 may also be operably coupled to one or more other software and/or hardware components, including, but not limited to, one or more of the components illustrated in FIG. 1.

Computation engine 120 may perform operations described using software, hardware, firmware, or a mixture of hardware, software, and firmware residing in and/or executing at computing system 100. Computation engine 120 may execute each of the module(s) with multiple processors or multiple devices. Computation engine 120 may execute one or more of such modules as a virtual machine or container executing on underlying hardware. One or more of such modules may execute as one or more services of an operating system or computing platform. One or more of such modules may execute as one or more executable programs at an application layer of a computing platform.

Memory 102 may comprise one or more storage devices. One or more components of computing system 100 (e.g., processors, memory 102, etc.) may be interconnected to enable inter-component communications (physically, communicatively, and/or operatively). In some examples, such connectivity may be provided by a system bus, a network connection, an inter-process communication data structure, local area network, wide area network, or any other method for communicating data. The one or more processors of computing system 100 may implement functionality and/or execute instructions associated with computing system 100. Examples of processors include microprocessors, application processors, display controllers, auxiliary processors, one or more sensor hubs, and any other hardware configured to function as a processor, a processing unit, or a processing device. Computing system 100 may use one or more processors to perform operations in accordance with one or more aspects of the present disclosure using software, hardware, firmware, or a mixture of hardware, software, and firmware residing in and/or executing at computing system 100.

Memory 102 may store information for processing during operation of computing system 100. In some examples, memory 102 comprises temporary memories, meaning that a primary purpose of the one or more storage devices of memory 102 is not long-term storage. Memory 102 may be configured for short-term storage of information as volatile memory and therefore not retain stored contents if deactivated. Examples of volatile memories include random access memories (RAM), dynamic random-access memories (DRAM), static random-access memories (SRAM), and other forms of volatile memories known in the art. Memory 102, in some examples, also include one or more computer-readable storage media. Memory 102 may be configured to store larger amounts of information than volatile memory. Memory 102 may further be configured for long-term storage of information as non-volatile memory space and retain information after activate/off cycles. Examples of non-volatile memories include magnetic hard disks, optical discs, Flash memories, or forms of electrically programmable memories (EPROM) or electrically erasable and programmable (EEPROM) memories. Memory 102 may store program instructions and/or data associated with one or more of the modules described in accordance with one or more aspects of this disclosure. The one or more storage devices of memory 102 may be distributed among multiple devices. Training data 118 is shown in dashed lines to indicate that memory 102 may not store training data 118 in all instances.

In the example of FIG. 1, ANN 106 receives input data from an input data set 110 and generates output data 112. Input data set 110 and output data 112 may contain various types of information. For example, input data set 110 may include image data, video data, audio data, source text data, numerical data, speech data, and so on. Output data 112 may include classification data, translated text data, image classification data, robotic control data, transcription data, and so on.

As mentioned above, ANN 106 has a plurality of components 108. Each of components 108 may represent, for instance, a neural network layer having a set of artificial neurons, a group of one or more artificial neurons within a layer, one or more channels or convolutional filters of a CNN, or another set of one or more computational elements that forms part of ANN 108. A computation element, such as an artificial neuron or convolutional filter, represents a set of operations, which may be parameterized during training to facilitate inferences by the ANN 108.

In examples in which ANN 108 is a DNN, each of layers 108 may include a respective set of artificial neurons. In such examples, components 108 include an input layer component 108A, an output layer component 108N, and one or more hidden layers components (e.g., layer components 108B through 108M). In such examples, the layer components may include fully connected layers, convolutional layers, pooling layers, and/or other types of layers. In a fully connected layer, the output of each neuron of a previous layer forms an input of each neuron of the fully connected layer. In a convolutional layer, each neuron of the convolutional layer processes input from neurons associated with the neuron's receptive field. Pooling layers combine the outputs of neuron clusters at one layer into a single neuron in the next layer.

Data path parameters 116 is a data structure in memory 102 that stores a uniform neural network model 117 for neural network 106 to apply, in inference mode, to input data set 110 to generate output data 112. More specifically, data path parameters 116 store a set of parameters for each of components 108. Parameters may include artificial neuron weights or biases, layer hyperparameters, or another parameter of the uniform neural network model 117. 'Uniform' in this context refers to the single neural network model for neural network 106, generated during training of neural network 106, that can be applied regardless of which components 108 are active/deactivated. For example, machine learning system 104 may use respective sets of parameters of the uniform neural network model 117 for components 108B, 108M if both components 108B, 108M are active. However, if component 108M is deactivated, machine learning system 104 still uses the same set of parameters of the uniform neural network model 117 for component 108B as before. Machine learning system 104 selectively applies the various sets of parameters of the uniform neural network model 117, stored to data path parameters 116, to components 108 of neural network 106 that are active during an inference (i.e., are not deactivated by gating module 107).

Each input of each artificial neuron in each of components 108 is associated with a corresponding weight in data path parameters 116. The output of the k-th artificial neuron in ANN 106 may be defined as:

$$y_k = \phi(W_k X_k) \quad (1)$$

In Equation (1), $y_k$ is the output of the k-th artificial neuron, $\phi(\cdot)$ is an activation function, $W_k$ is a vector of weights for the k-th artificial neuron (e.g., weights in data path parameters 116), and $X_k$ is a vector of value of inputs to the k-th artificial neuron. In some examples, one or more of the inputs to the k-th artificial neuron is a bias term that is not an output value of another artificial neuron or based on source data. Various activation functions are known in the art, such as Rectified Linear Unit (ReLU), TanH, Sigmoid, and so on.

In general, ANN 106 is a parameterized function $h_\theta(x)$ mapping an input $x \in X$ to an output $y \in Y$. In accordance with techniques of this disclosure, ANN 106 is a throttleable neural network (TNN), which is a function of two variables, $H_\theta(x,u)$, where $u \in [0,1]$ is a control parameter that indicates how much "computational effort" the network should exert. The variable u is an additional input to the network; after training is complete, the parameters θ are fixed but u can change. Other ranges for u are possible. ANN 106 can be throttled by adjusting the value of u at run-time, as described in further detail below. In this example framework, the combined loss function of a TNN has two components, $$J(x,u,y,\hat{y}) = L(y,\hat{y}) + \lambda C(x,u). \quad (2)$$

The "task loss" component, L, is a task-specific performance measure, e.g., cross-entropy loss for classification. The "complexity loss," C, measures the resources used (e.g., energy, processor (CPU) time, etc.) when the network processes example x at "effort level" u, and λ controls the balance of the two losses. The quantity $\hat{y}$ is the predicted value for x by an ANN.

Complexity loss may incur due to memory access (i.e., reading from and writing to the memory) that requires electrical energy. Thus, the size of storage locations in memory 102 available for storage of the parameters may reflect the learning capacity of ANN 106 (i.e., the capacity of ANN 106 to learn things), and at the same time, the size of the storage locations in memory 102 available for storage of parameters may impact the computational efficiency, processing time, and power consumption of ANN 106. For example, the AlexNet CNN with 630 million synaptic connections would roughly consume an estimated 3 Tflops/s (assuming 512×512 images at 100 Gflops/frame). Furthermore, based on rough estimates, the AlexNet CNN would consume 8 watts for DRAM access alone, far exceeding the power budgets for a typical mobile device. Thus, the power footprint required for these modern DNNs in inference mode may exceed the power budgets for a typical mobile device. Larger scale DNNs can reach up to 1 billion parameters, and the trend toward larger and deeper networks is growing.

Reiterating on the issue of power and memory size, it is well understood that power densities no longer scale down with Moore's Law, and computational throughput necessitates scaling energy efficiencies (e.g., joules/operation). To a first order, the energy for an operation is comprised of: (1) energy for the computation, e.g., floating point operation, (2) energy to move data to/from storage to the processing core, and (3) energy required to store data. It is also well established that energy for data movement (e.g., memory read and write operations) is likely to dominate the energy cost of computation. This effect may be amplified by the ANN computational characteristics with low operations/byte ratio and poor locality behaviors.

The techniques described in this disclosure may possess technical advantages over existing schemes. For example, one existing framework for throttling a neural network at runtime involves a neural network in which each layer has multiple data paths, and a "Composer" module chooses which path to take in each layer. The Composer takes a control parameter as input and its loss function penalizes complexity weighted by the control signal. The TNN framework described herein is broader and subsumes this model. Another existing framework, MobileNets, demonstrated how modifications to an architecture can reduce resource requirements with minimal loss of accuracy. The TNN framework differs from both the Composer and MobileNets approaches in that the computing system 100 implements runtime throttling using a uniform neural network model in which a gating function selectively deactivates components of a neural network based on one or more control parameters provided at runtime, and in some cases a single utilization parameter, u.

Another family of approaches, involving model compression, that performs such a transformation automatically is quantization, which uses reduced-precision for weights and/or activations to reduce memory usage and, in some cases, enable cheaper computation in hardware. Examples include Binarized NNs, XNOR-Nets, and (Generalized) Ternary Connect. Another approach is to remove computations without affecting the result, such as by pruning near-0 weights or using low-rank weight tensor approximations. Other schemes are based on structuring the computations in the network to use available hardware elements most effectively. The TNN framework differs from model compression in that the computing system 100 implements runtime throttling by selectively deactivating components of a neural network based on one or more control parameters provided at runtime, and in some cases a single utilization parameter, u. Rather than reduced precision of the computations, as with quantization, the computing system 100 can avoid some computations entirely by selectively deactivating components.

Conditional computation or "gating" is based on turning off parts of the network. This can be viewed as "block-wise" dropout applied at runtime. One example is stochastic gating with Bernoulli random variables. The sparsely gated mixture-of-experts model learns to "rank" neural network modules and selects only the top k modules for computation. Many conditional computation schemes use ResNet modules as building blocks, leveraging the observation that ResNets behave as an ensemble of shallower networks. Skipnet and Blockdrop are very similar approaches that learn to bypass ResNet blocks based on the input. A notable subclass of conditional computation approaches is based early stopping once some threshold of "confidence" is achieved. Examples of this approach include Adaptive Computation Time (ACT/SACT), BranchyNet and Dynamic Time Recurrent Visual Attention (DT-RAM). The TNN framework differs from static condition computation/gating approaches, such as those described above, in that the computing system 100 implements runtime throttling using a uniform neural network model in which a gating function selectively deactivates components of a neural network based on one or more control parameters provided at runtime and, in some cases, based on a single utilization parameter, u.

As such, in some examples, a single runtime input u controls resource utilization by throttleable neural network 106. There may therefore be a single neural network 106 and uniform neural network model 117 that is the same size as (e.g., same number of data path parameters 116), or only slightly larger than, a corresponding non-throttleable version of neural network 106. This provides a modular scheme in which a control device or operator can input u as a control parameter to manage resource use without knowledge of the internal architecture of the neural network 106, in contrast to the above approaches. Rather, u can simply be selected as a desired utilization parameter. In addition, the gating module 107 can be trained without re-training throttleable neural network 106. Still further, the techniques may enable different control devices on different platforms/applications to use the same trained, throttleable neural network 106.

As described elsewhere in further detail in this disclosure, there are several ways to map u to particular components to deactivate. One approach is a hard-coded mapping in the form of rules. For example, a rule may state "if u=0.5, then deactivate components 108B, 108C, and 108J"). Other rules can be manually configured for different values of u. The mapping can also be a learned function, however. In that case, computing system 100 trains the mapping (denoted g(x, u) herein) to jointly minimize error and resource consumption, where the error may be problem-specific. For example, there may be certain components of neural network 106 that are good at recognizing a particular type of object; g might learn that if input image x looks similar to this type of object and u is (2/the number of components 108), then gating module 107 applying g should activate the two components 108 that are best at recognizing this type of object, while deactivating the rest of components 108. These mappings are discovered from the training data by, e.g., training the gating module 107 and neural network 106; the user has no visibility in to which components are better at recognizing particular types of objects in this example. This, again, contrast to the existing schemes described above.

As described herein, machine learning system 104 addresses disadvantages of the above schemes by leveraging a gating module 107 having a gating function configured to select components 108 of the ANN 106 to deactivate based on one or more control parameter(s) 105. Control parameter(s) 105 indicate to gating module 107 and correlate to an amount of computational effort to be exerted by ANN 106. Control parameter(s) 105 represent an example of variables u in Equation (2) and may be generated by computing system 100, configured by a user or operator, and/or based on an external signal from a sensor or controller (indicating e.g., battery, temperature, server availability, or lighting conditions for instance), for instance.

Machine learning system 104 trains runtime-throttleable ANN 106 to be throttled via a gating scheme in which the set of disjoint components 108 can be individually "turned off" at runtime without significantly affecting the accuracy of neural network inferences, represented as output data 112 in FIG. 1. Machine learning system 104 may separately train gating module 107, in some instances, to determine which trained components 108 of ANN 106 to turn off to obtain operable performance for a given level of resource use of computational, power, or other resources by ANN 106. This level may then be specified using control parameter(s) 105 at runtime to adapt ANN 106 to operate at the specified level and in this way balance performance and resource use for different operating conditions. To adapt ANN 106, gating module 107 applies the gating function, which may itself be a neural network, to select component 108 of ANN 106 to deactivate based on control parameter(s) 105. The adapted or "throttled" ANN 106 may then operate in inference mode to process input data from input data set 110 to generate output data 112. By deactivating at least one of components 108, the number of read operations for parameters of the uniform neural network model 117 may be reduced, which may result in less delay and less power consumption. Unlike conditional computation therefore, which is static in the sense that the resulting network represents one point in the trade-space between performance and resource use, the techniques of this disclosure permit dynamic, runtime specification of the tradeoff point between performance and resource use. The control parameter(s) 105 can be varied before each inference, for example.

While illustrated and described as performing both training and inference, training and inference may be performed by different computing systems 100. For example, computing system 100 may train neural network 106 with data path parameters 116 (and in some cases gating module 107 with gating parameters 114). These models may then be deployed to other computing devices, such as any of the edge devices listed above.

In some examples, gating parameters 114 are stored in a data structure, in memory 102, that stores parameters for gating module 107 to apply, in inference mode, to process control parameter(s) 105 to output indications of components 108 for gating. Parameters may include artificial neuron weights or biases, layer hyperparameters, or another parameter of a neural network model or other function for gating module 107. Other example implementations for gating module 107 are described below.

Figure 2:
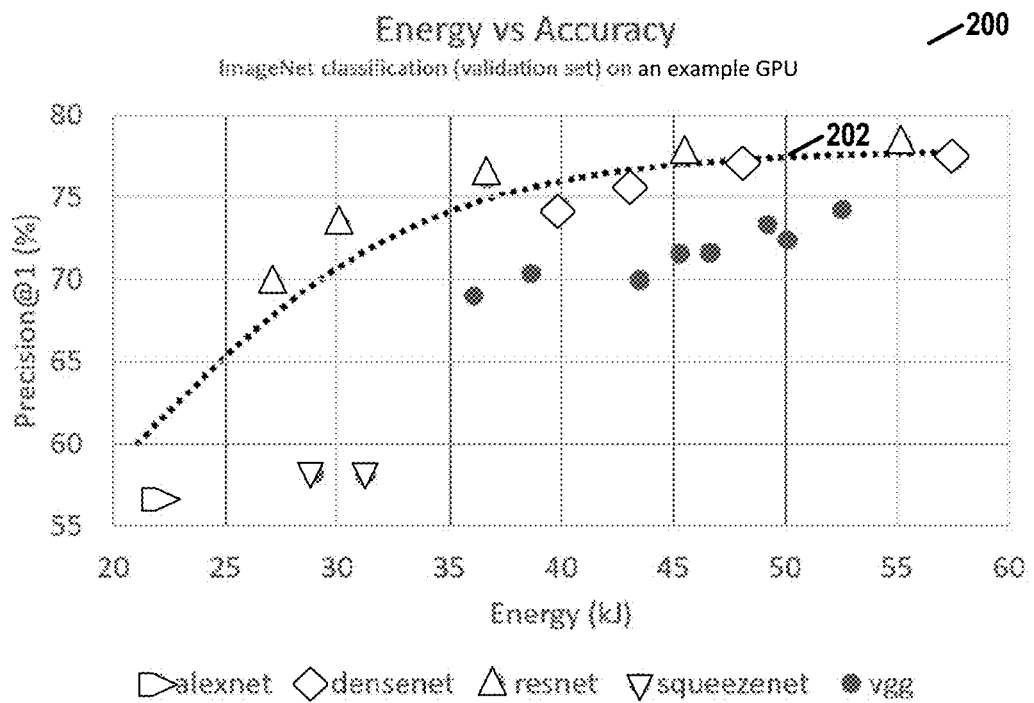
FIG. 2 is an example chart illustrating accuracy versus resource consumption for various neural network architectures.

FIG. 2 is a chart illustrating accuracy versus resource consumption for various neural network architectures. Neural network architectures are a compromise between resource consumption and performance/accuracy (performance may in some cases measure latency/speed of prediction). Chart 200 shows energy consumption vs. top-1 accuracy for the ImageNet validation set on a Graphics Processing Unit (GPU) (mean of 2 runs on different hardware) for various architectures (Alexnet, Densenet, ResNet, Squeezenet, and VGG) at various points in the tradeoff space between resource consumption and performance/accuracy. In accordance with techniques of this disclosure, a throttleable neural network 106 is trained to obtain a single, uniform neural network model 117 for which this trade-off can be varied at runtime (represented by dotted line 202). For example, machine learning system 104 may train ANN 106 to obtain a uniform neural network model 117 that achieves 65% precision @1(%) at 25 kilojoules but achieves 78% precision @1(%) at 50 kJ (@1 refers to top-1 accuracy). Different values for control parameter(s) 105 may correspond to different locations on the x-axis, the power consumption being determined by the number and characteristics of the active versus deactivated components 108.

FIGS. 3A-3B and 4A-4B are block diagrams illustrating different approaches toward organizing gated components, according to techniques described in this disclosure. Machine learning system 104 trains and operates a throttleable version of ANN 106 that has throttleable versions of common neural network components 108. In some example, for throttling to achieve the goal of reducing resource use, the function that determines how to throttle ANN 106 should be much cheaper to compute than the elements of ANN 106 that it controls. It is not practical, for example, to make throttling decisions at the level of individual neurons. In some cases, the throttling decision is based on deactivating sets of neurons, either by structuring the network in components that can be controlled individually, or by using random dropout with a controllable dropout rate, for instance. Components illustrated with a hash pattern are active.

One family of throttleable neural network architectures as described herein is "modular gated networks." In some examples, based on outputs of gating module 107 that indicate which components 108 to deactivate, machine learning system 104 applies only those components 108 that are active. This is referred to as gating, examples of which are illustrated in FIGS. 3A-3B and 4A-4B.

A "gated module" of a modular gated network has the function form $$y = a(g_\Psi(x,u) \odot f_\theta(x)), \quad (3)$$

where $f_\theta(x) = (f_1, \ldots, f_n)$ is a vector of components with parameters $\theta$, $g_\Psi(x, u)$ X× $[0,1] \mapsto \{0,1\}^n$ is the gating function with parameters $\Psi$, $\odot$ denotes element-wise multiplication, and a is the aggregation function that maps $g_\Psi(x, u) \odot f_\theta(x)$ to the appropriate output space. The elements of f can be arbitrary neural network modules, but in some cases the modules have the same input space and their outputs can be aggregated appropriately, such as by concatenating or summing them. A single gated module is described hereinafter, but multiple gated modules may be used to create a typical multi-layer throttleable neural network. A gated module may include multiple components 108, for instance, that can be individually gated.

In some cases, machine learning system 104 may normalize activations so that the output magnitude is similar for all dropout rates, in a manner similar to existing dropout schemes. In practice, then, gated modules have the function form $$y = a(\bar{g}_\Psi(x,u) \odot f_\theta(x)), \quad (4)$$

where $\bar{g}$ is the normalized gating function, $$\bar{g}(x, u) \stackrel{def}{=} \frac{g(x, u)}{\|g(x, u)\|_1} \quad (5)$$

When $g_i = 0$, the component f is effectively disabled. When training on a GPU, machine learning system 104 may implement the mathematical form (3) directly to take advantage of vectorized computations. In a deployed system, computing $f_i$ when $g_i = 0$ may be skipped to realize power savings.

The components of f could be anything from individual neurons to entire networks. An intermediate level of granularity can be preferable in some cases. The size of neural networks can be measured along two dimensions: the "width" or number of features (e.g., artificial neurons or groups thereof, convolutions filters, and so forth) per layer, and the "depth" or number of layers from input to output. Decompositions into components can be defined along both of these dimensions.

Gating module 107 implements the gating function $g_\psi(x, u)$. The gating function may be implemented in various ways. The simplest approach is simple random gating, in which each component of the gating function is a random variable $g_i$~Bernoulli(u). In the second approach, referred to as blind gating, machine learning system 104 trains a simple two-layer fully-connected network to implement an input-independent gating function g(u). The third and most complex approach, referred to as contextual gating, uses a full CNN (which may be much smaller than the main ANN 106) to implement an input-dependent gating function. The gating module 107 neural network in this third example may be a minimal ResNet architecture or other neural network.

Figure 3A:
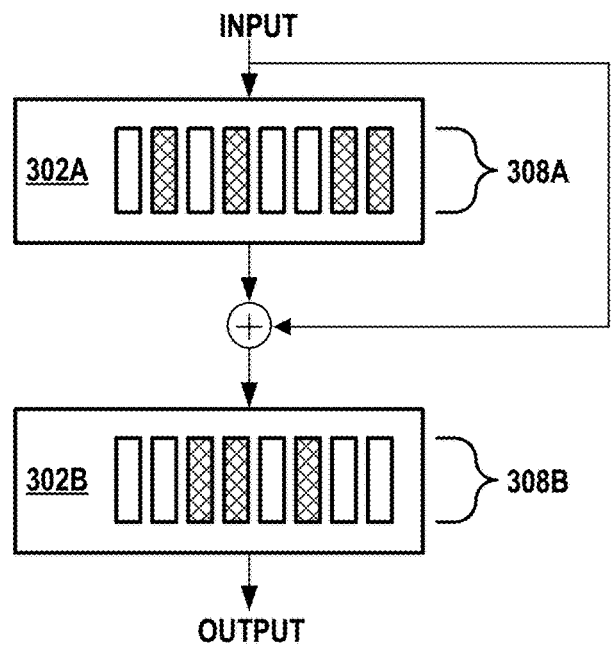
FIGS. 3A-3B are block diagrams illustrating different example approaches toward organizing gated components, according to techniques described in this disclosure.

FIG. 3A illustrates modules 302A-302B for a multi-layer ANN, each of modules 302A-302B having eight different components in respective sets of components 308A-308B. FIG. 3A illustrates widthwise gating. Components 308 may be example instances of components 108. Widthwise gating entails disabling some of the neurons in a single layer. To reduce the complexity of the gating function, component gating schemes are considered in which neurons are partitioned into disjoint sets and gated as a group. In convolution layers, the components are sets of convolutional filters; in fully connected layers, the components are sets of neurons. Examples of width-wise gating include the mixture-of-experts layer and the Composer model.

Figure 3B:
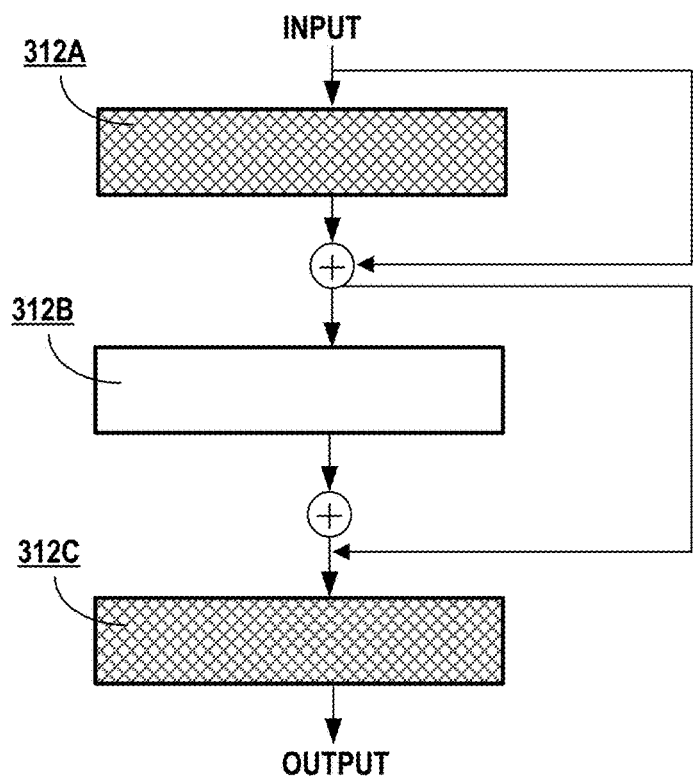

FIG. 3B illustrates components 312A-312C for a multi-layer ANN, each of components 312A-312C representing a different layer and one or more components, which may be fully-connected and may be example instances of components 108. FIG. 3B illustrates depthwise gating. Depth-wise gating entails bypassing entire layer, which may be applicable only to networks that have skip-connections, since otherwise disabling a layer would cause all subsequent layers to receive no information about the input.

FIGS. 3A-3B illustrate independent gating. In other work on gated networks, the components of each gated module are viewed as independent of one another, with few constraints on their pattern of activation. This independent gating scheme makes sense when the goal is for each component to model different features of the data, such as in a mixture-of-experts architecture, and there is some evidence that independent contextual gating induces this type of specialization. In some applications of the described techniques, however, to throttle over a range of set points, this specialization is not necessary and may be counterproductive, since it can be expected to produce some redundancy in the representation.

Figure 4A:
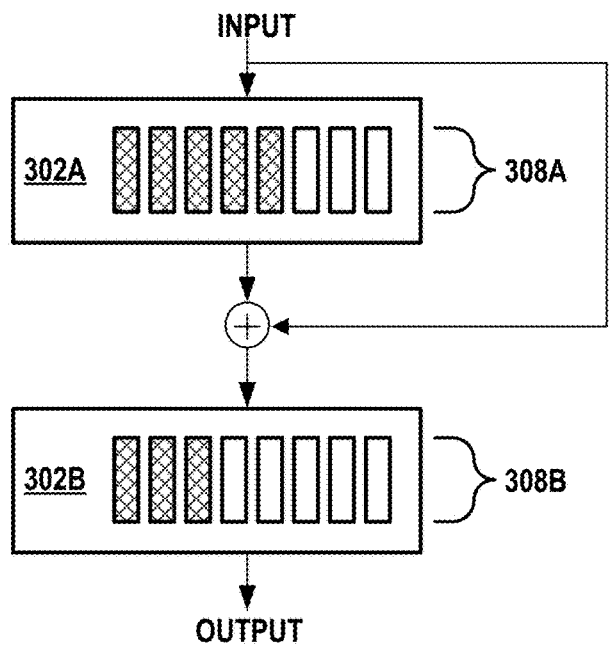
FIGS. 4A-4B are block diagrams illustrating different example approaches toward organizing gated components, according to techniques described in this disclosure.
Figure 4B:
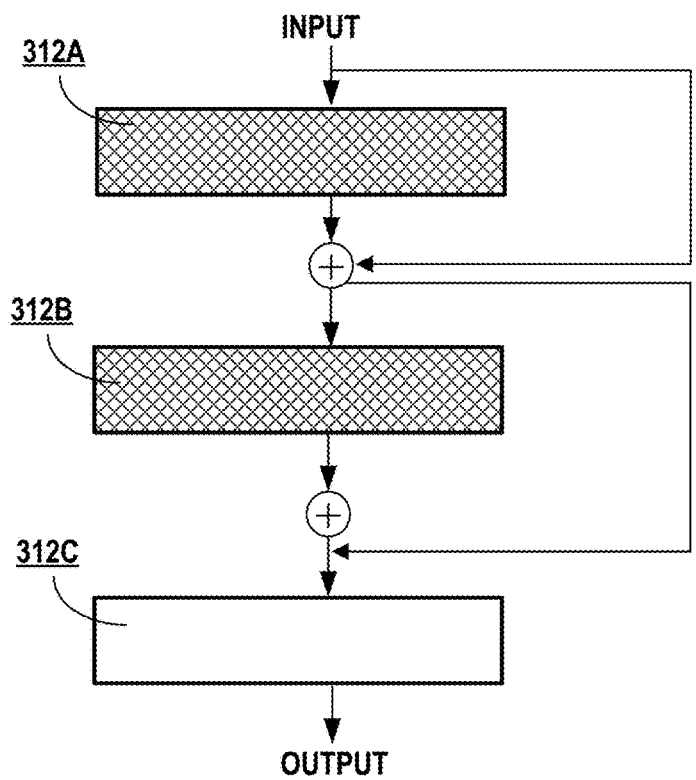

Therefore, in some examples, machine learning system 104 applies nested gating. In the nested scheme, the gating function g is constrained such that $g_i > 0 \Rightarrow g_j > 0 \forall j < i$. This causes nested orderings of active components for different values of u. The nested scheme in some cases provides superior throttling performance given the same architecture. FIG. 4A illustrates nested width-wise gating with components ordered in ascending order for $g_i$. FIG. 4B illustrates nested depth-wise gating with components ordered in ascending order for $g_i$.

Machine learning system 104 may store mappings or identifiers for different components 108 and use these to determine which components 108 to gate, based on the output indications from gating module 107. For example, gating module 107 may output identifiers for the components 108 to gate, or may output a value that maps to identifiers for the components 108 to gate, as examples. In any case, machine learning system 104 executes gating module 107 to selectively deactivate, based on control parameter(s) 105, by applying the gating function, one or more of components 108 to produce a modified neural network 106 that does not include the deactivated components of components 108 to throttle an amount of resources used to perform prediction. Machine learning system 104 then executes the active components of components 108 with the respective sets of parameters of the uniform neural network model 117 for the active components to apply the modified neural network to input data to generate output data for the input data. Machine learning system 104 may store or output the output data.

Training Throttleable Networks

The goal of training a throttleable network is to create a uniform neural network model 117 that varies its complexity in response to the control parameter u. The natural measure of complexity is the number of active components, possibly weighted by some measure of resource consumption for each component, $$c(g) = |w|_1^{-1} \Sigma_i w_i 1(g_i \neq 0). \quad (6)$$

The gate control strategy embodied in g(x, u) modulates the resource utilization of the TNN. Experiments conducted to evaluate TNNs described herein examine both static and learned gating functions. In the static approaches, the control parameter u determines the number of gated components that should be used, and the choice of which components to turn on is made according to a fixed rule. Empirically, a straightforward application of the nested gating order works well.

In some cases, gating module 107 includes a gating neural network model that machine learning system 104 trains with the gating function. Machine learning system 104 may enforce the constraint that the actual complexity C(g) should not exceed the target complexity u by optimizing the combined loss function $J(x, u, y, \hat{y}) = L(y, \hat{y}) + \lambda C(x, u)$. Different example variants of C include the two functional forms $$C_{hinge}^p(x, u) \stackrel{def}{=} \max(0, c(g(x, u)) - u)^p \quad (7)$$

$$C_{dist}^p(x, u) \stackrel{def}{=} |c(g(x, u)) - u|^p, \quad (8)$$

for $p \in \{1,2\}$. In a sense, the "hinge" penalty (7) is the "correct" objective, since there is no reason to force the model to use more resources unless it improves the accuracy. In practice, the "distance" penalty (8) resulted in somewhat higher accuracy for the same resource use.

Learning the gate module gating function is complicated by the "rich get richer" interaction between g and f, in which only the subset of f selected by g receives training, which improves its performance and reinforces the tendency of g to select that subset of f. To address this, machine learning system 104 may apply a two-phase training strategy. In the first phase, machine learning system 104 trains the "data path" with random gating to optimize only L while being "compatible" with gating. In the second phase, machine learning system 104 trains the gating controller to optimize the full objective J while keeping the data path fixed.

An example algorithm for Two-Phase TNN training is as follows:

```
{Train the Data Path for the Main Neural Network}
FOR #epochs in Phase 1 DO
    FOR ALL (x,y) in training data DO
        Let k ~ DiscreteUniform[0,n]
        Let g = 1^k 0^(n-k)
        IF using Independent Gating THEN
            g ← RandomPermutation (g)
        Let ŷ = α(ḡ ⊙ f_θ(x))
        θ ← θ - α∇L(y, ŷ)
{Train the Gating Module}
FOR #epochs in Phase 2 DO
    FOR ALL (x,y) in training data DO
        Let u ~ Uniform[0,1]
        Let ŷ = α(ḡ_ψ(x, u) ⊙ f_θ(x))
        Ψ ← Ψ - α∇J(x, u, y, y)
```

Figure 9:
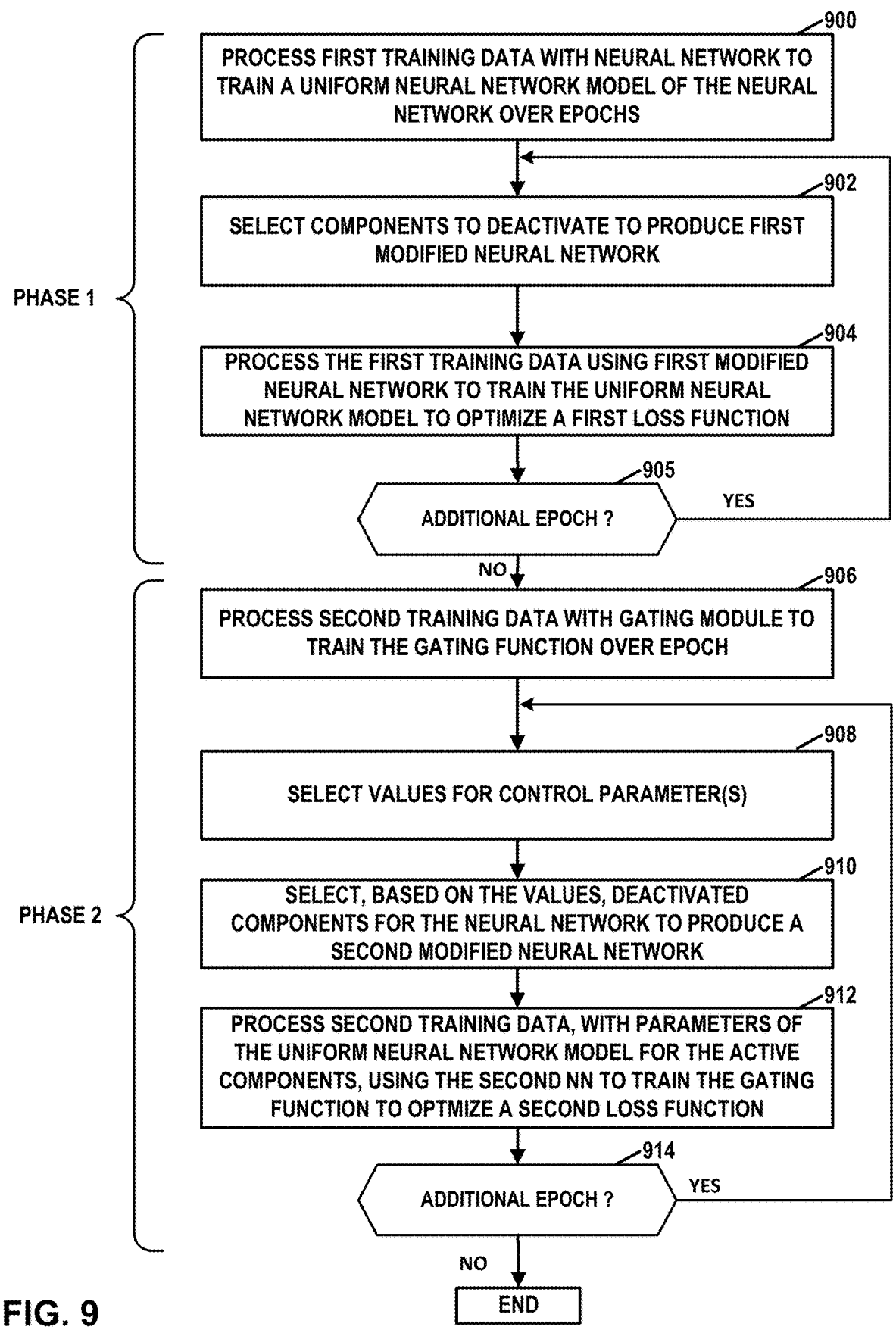
FIG. 9 is a flowchart illustrating an example mode of operation for training a throttleable neural network, according to techniques described in this disclosure.

The above algorithm is described further with respect to FIG. 9. FIG. 9 is a flowchart illustrating an example mode of operation for training a throttleable neural network, according to techniques described in this disclosure. The mode of operation is described with respect to computing system 100 of FIG. 1 executing machine learning system 104 but may be performed by other machine learning systems described herein.

Figure 5:
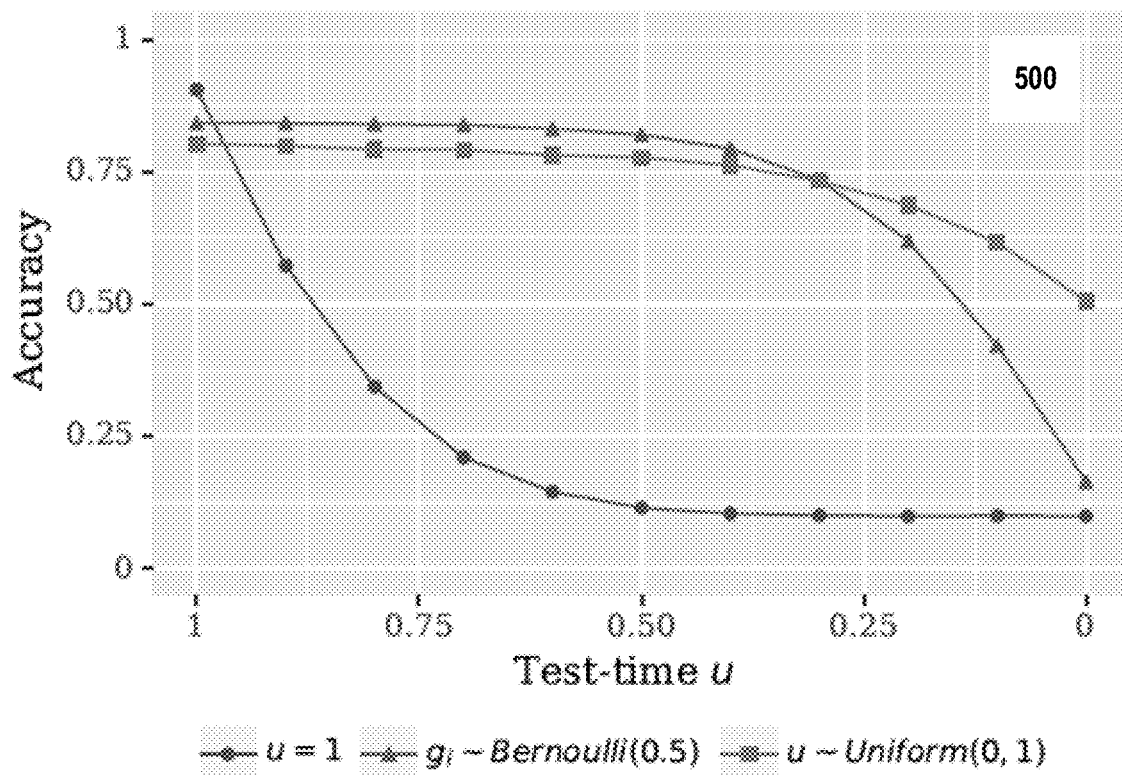
FIG. 5 is a chart illustrating results of different example training regimes for throttleable neural networks, according to techniques described in this disclosure.

During Phase 1 of training, machine learning system 104 trains the feature representations of the TNN to be robust to varying amounts of gating. The choice of how u is sampled during training is important for obtaining the desired performance profile. From an empirical risk minimization perspective, the training-time distribution of u may in some cases be drawn from a prior distribution of the values of u expected at test-time or run-time. Ordinary training without gating can be viewed as one extreme, where u=1 at all times. FIG. 5 illustrates these three schemes on the CIFAR10 dataset using a simple ResNeXt model. Chart 500 illustrates a trade-off between peak performance and "average-case" performance as quantified by the area under the curve. Thus, the training-time distribution of u should if possible be selected to match the anticipated test-time usage profile.

In experiments, machine learning system 104 can be configured with a training scheme designed to maximize the useful range of u. For each training example, machine learning system 104 draws u~Uniform[0,1]. Then, for each gated module, machine learning selects k blocks to be gated on, where k=min(n,⌊u·(n+1)⌋) and n is the number of blocks in the module. Layers 302 are examples of gated modules with components 308 as blocks. For nested gating strategies, machine learning system 104 sets $g_1, \ldots, g_k$ to 1 and $g_{k+1}, \ldots, g_n$ to 0, while for independent gating strategies machine learning system 104 selects k indices at random without replacement.

In Phase 1, in accordance with the above, machine learning system 104, executed by computation engine 120, processes first training data from training data 118 to train the uniform neural network model 117 of ANN 106 to learn data path parameters 116, over multiple first epochs, each epoch including steps 902 and 904. (900). For each epoch, machine learning system 104 selects one or more components 108 to deactivate to produce a first modified neural network that does not include the deactivated components (902). Machine learning system 104 may select a number k less than the number n of components 108 and select k components 108 to retain as active, deactivating the rest according to independent or nested gating to determine g. This throttles an amount of resources used to process the training data. Machine learning system 104 processes the first training data using the first modified neural network, e.g., [ŷ=a(ḡ⊙f_θ(x))] to train the uniform neural network model 117 to optimize a first loss function (904). Machine learning system 104 may use backpropagation, for instance, to optimize the first loss function, e.g., [θ ← θ−α∇L(y, ŷ)]. The first loss function may be the task loss function L from Equation (2). If additional epochs remain (YES branch of 905), machine learning system 104 re-executes steps 902, 904. Otherwise (NO branch of 905), machine learning system 104 stores the learned parameters for the components 108 to data path parameters 116 and proceeds to Phase 2.

In Phase 2 of training, machine learning system 104 learns by holding the data path parameters θ fixed and optimizing the gate module parameters Ψ. As in Phase 1, machine learning system 104 draws target utilization u from a uniform distribution. The components of the gating function may be modeled as Bernoulli random variables, $$g_i(x,u;\Psi) \sim \text{Bernoulli}(p_i(x,u;\Psi)) \quad (9)$$

and machine learning system 104 learns the function $p_\Psi$ giving the activation probabilities of each component. Since C is discontinuous, machine learning system 104 may employ a gradient estimator for training. Two existing methods of training networks with stochastic discrete neurons for this purpose include the score function estimator and continuous relaxations. These may be applied by machine learning system 104 in various examples.

Score Function Estimator

The most common approach is to treat g as the output of a stochastic policy and train it with a policy gradient method such as the score function (REINFORCE) estimator, $$\nabla_\Psi E[J] = E[J \cdot \nabla_\Psi \log Pr(g_\Psi(x,u))], \quad (10)$$

where $Pr(g_\Psi(x,u))$ is the density of the random variable g. Since each $g_i$ is an independent Bernoulli random variable (Formula 9), the log probability is given by $$\log Pr(g) = \Sigma_i \log[g_i p_i + (1-g_i)(1-p_i)].$$

Continuous Relaxations

Relaxation approaches soften the discrete gate vector into a continuous vector of "activation strengths." In particular, machine learning system may use concrete random variables to stand in for discrete gating during training. Concrete distributions have a temperature parameter t where the limit t→0 recovers a corresponding discrete distribution. The Bernoulli distribution is replaced by the binary Concrete distribution, $$g_i \sim \sigma((L + \log \alpha_i)^{-t})$$

where L~Logistic(0,1) and $\alpha_i = p_i/(1-p_i)$. Machine learning system 104 may set t>0 during training to make the network differentiable and use t=0 during testing to recover the desired hard-gated network.

In accordance with the above, in Phase 2 of training of the gating module 107, in this example, machine learning system 140 processes second training data from training data 118 to train the gating function over multiple second epochs, each epoch including steps 908, 910, and 912. For training in each epoch, machine learning system 104 selects respective value(s) for control parameter(s) 105 (908). Control parameter(s) 105 may be a single target utilization value that denotes a dropout probability for each component 108, selected from Uniform[0,1]. In other words, rather than multiple parameters for altering operations of neural network 106, the control parameter(s) 105 may be a single utilization value, e.g., in the range 0→1. This value represents a desired utilization of a throttleable neural network 106 having a uniform NN model 117 and thus permits a generalized input for the gating function.

Based on the respective value(s) for control parameter(s) 105, machine learning system 104 selects one or more deactivated components from components 108 to produce a second modified neural network that does not include the deactivated components (910). This has the effect of throttling an amount of resources used to perform prediction in inference mode.

Machine learning system 104 reads the respective sets of parameters for the active components from components 108 from data path parameters 116, for the uniform neural network model 117, and processes the second training data using the second modified neural network having the active components, e.g., $[\hat{y}=a(\overline{g}_\Psi(x, u)\odot f_\theta(x))]$ to train the gating function of gating module 107 to optimize a second loss function, e.g., $[\Psi \leftarrow \Psi - \alpha \nabla J(x, u, y, \hat{y})]$ (912). The second loss function may be the loss function in Equation (2).

If additional epochs remain (YES branch of 914), machine learning system 104 re-executes steps 908, 910, 912. Otherwise (NO branch of 905), machine learning system 104 stores the learned parameters for the gating function to gating parameters 114.

Figure 10:
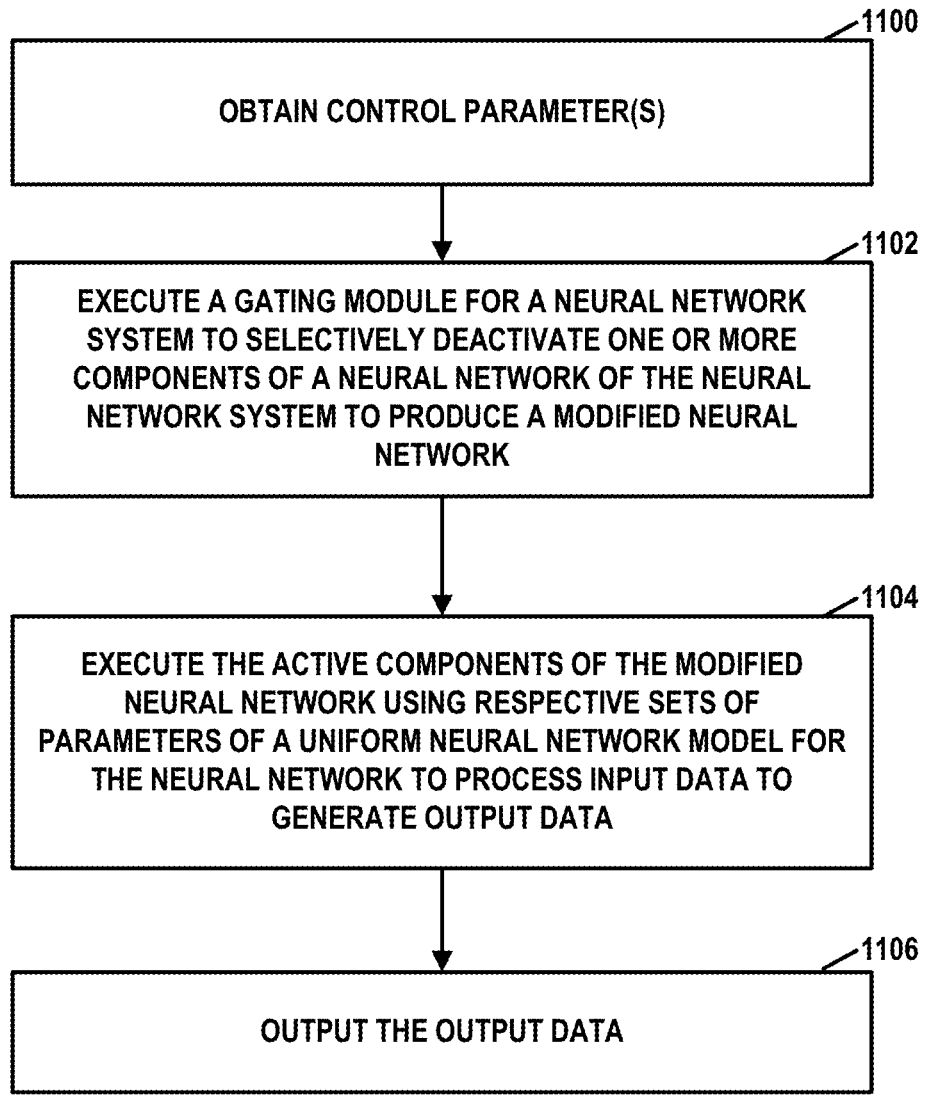
FIG. 10 is a flowchart illustrating an example mode of operation for throttling and executing a throttleable neural network, according to techniques described in this disclosure.

FIG. 10 is a flowchart illustrating an example mode of operation for throttling and executing a throttleable neural network, according to techniques described in this disclosure. The mode of operation is described with respect to computing system 100 of FIG. 1 but may be performed by other machine learning systems described herein.

Machine learning system 104, executed by computation engine 120, obtains one or more control parameter(s) 105 (1100). Machine learning system 104 executes gating module 107 to determine the components 108 that will be active for a forthcoming inference. In some examples, machine learning system 104 may read gating parameters 114 and apply them to a neural network of gating module 107. The active components 108 make up a modified neural network that does not include the deactivated components, which throttles an amount of resources used to perform prediction. Where ANN 106 with all components 108 is the full neural network, this determination in effect selectively deactivates (or alternatively, selectively activates) some of components 108 (1102).

Machine learning system 104 executes, after reading the respective sets of data path parameters from data path parameters 116 for the active components of the modified neural network, the active components to process input data from input data set 110 to generate output data 112 for the input data (1104). Machine learning system 104 may store the output data 112 to memory 102 or may output the output data 112 via a communication unit or display, for instance (1106).

Figure 6:
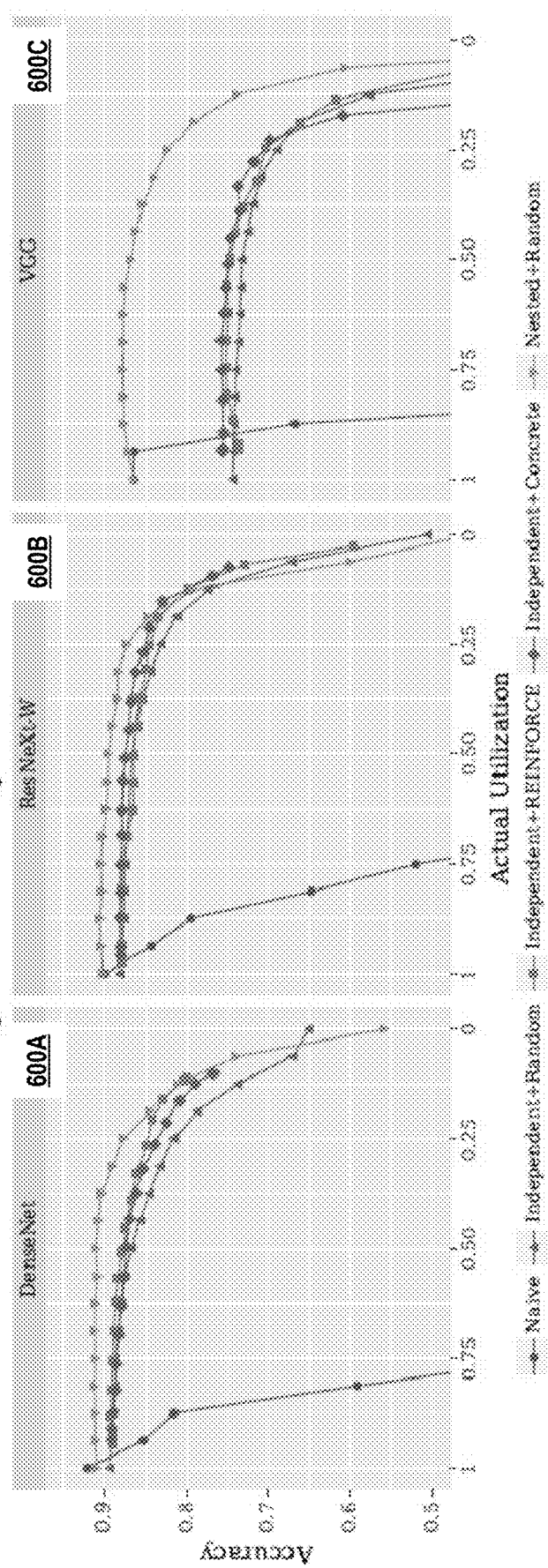
FIGS. 6-8 include charts illustrating example experimental results for throttleable neural networks and training methods thereof, according to techniques described in this disclosure.
Figure 7:
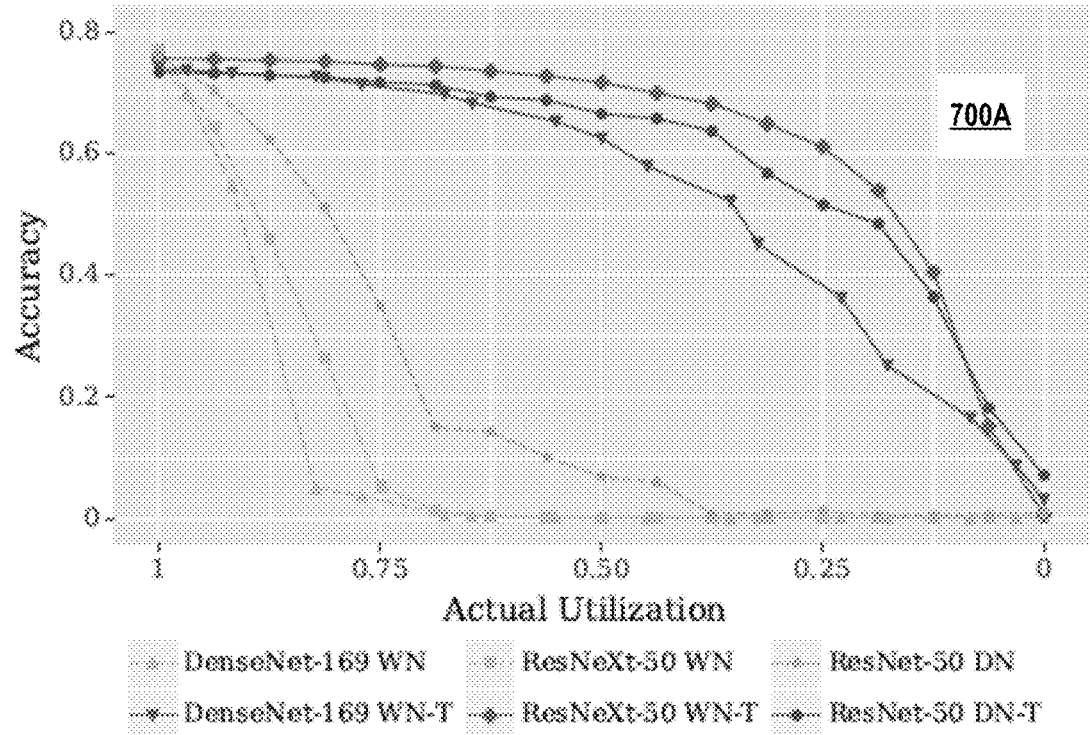
Figure 7:
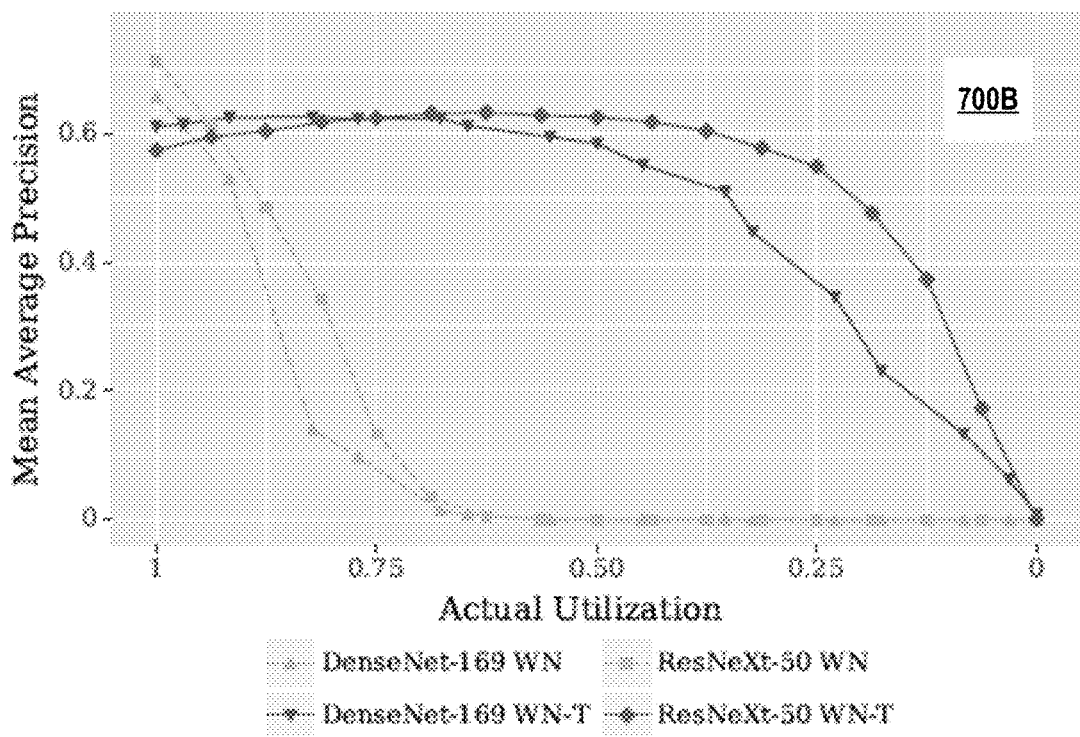
Figure 8:
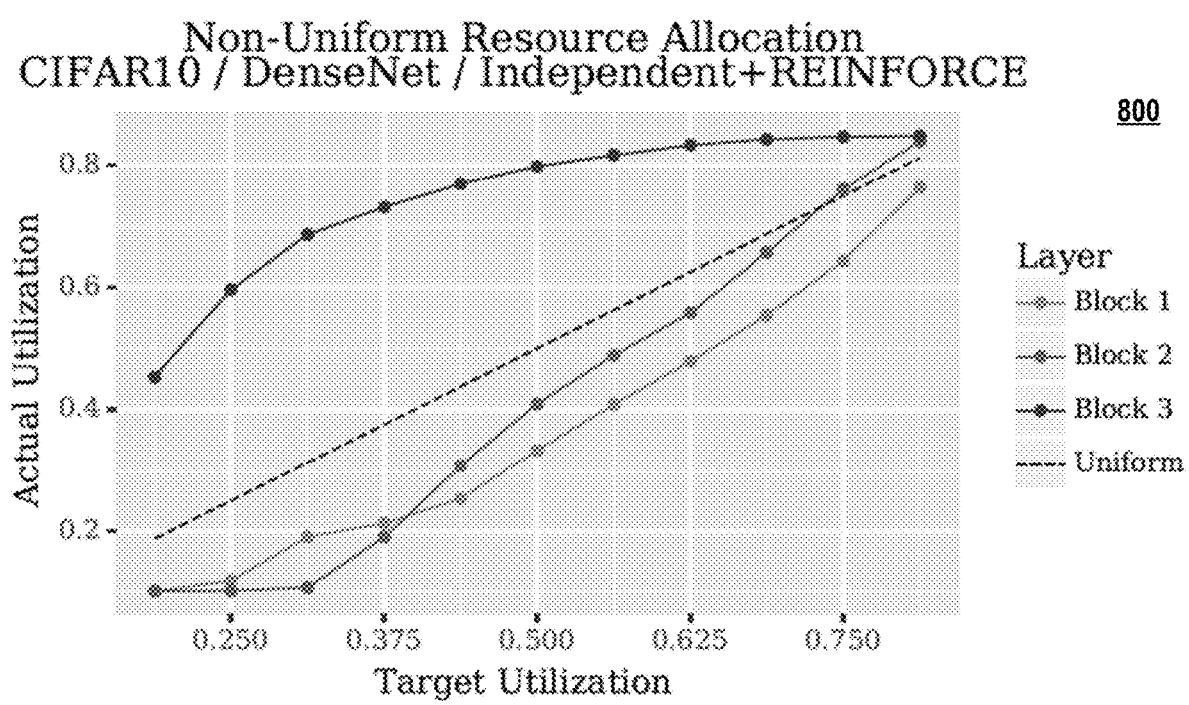

FIGS. 6-8 include charts illustrating experimental results for throttleable neural networks and training methods thereof, according to techniques described in this disclosure. Experimental results compare different approaches to creating TNNs using gating in image classification and object detection tasks. The goal in the experiments was not to achieve state-of-the-art performance in any task, but rather to make a fair comparison between gating strategies using representative NN models and tasks.

To examine the generality of the TNN concept, throttleable versions of several popular CNN architectures were created, as summarized in Table 1.

TABLE 1

| Architecture | Axis | Components | Aggregation |
| --- | --- | --- | --- |
| VGG | Width | Conv. Filters | Concat |
| ResNeXt-W | Width | Conv. Filters | Sum |
| ResNeXt-D | Depth | Layers | Sum |
| DenseNet | Width | Layers | Concat |

VGG: The VGG architecture is a typical example of a "single-path" CNN. Width-wise gating is applied to groups of convolutional filters in each layer and the group outputs are combined by concatenating them. Because VGG lacks skip-connections, at least one group must be active in each layer to avoid making the output zero.

ResNeXt-W: ResNeXt is a modification of ResNet that structures each ResNet layer into groups of convolutional filters that are combined by summing. A widthwise-gated version of ResNeXt ("ResNeXt-W") is created by treating each filter group as a gated component. This architecture is particularly well-suited for width-wise gating, since the summing operation is "smoother" than concatenation.

ResNet-D A depthwise-gated version of standard ResNet ("ResNet-D"), similar to Blockdrop/Skipnet. In this architecture, the gated components are entire ResNet blocks that are skipped when gated off.

DenseNet: In the DenseNet architecture, each dense block contains multiple narrow layers that are combined via concatenation. These narrow layers make natural units for gating. This architecture may be primarily widthwise-gated since the components are concatenated "horizontally," but it also has qualities of depthwise gating due to the skip connections.

Image Classification: CIFAR10

The CIFAR10 dataset is a standard image classification benchmark consisting of 32×32 pixel color images of 10 categories of object. The standard 50 k image training set and 10 k image test set were used, with no data augmentation. The CNN architectures were as follows. DenseNet: DenseNet-BC with 3 dense blocks having 16 components each with a growth rate of 12. ResNeXt: The ResNeXt architecture for CIFAR with 16 gated components in each of the 3 stages. VGG: The VGG-D architecture truncated to the first 3 convolution stages followed by a 4096 unit fully-connected layer; all three convolution stages and the fully-connected layer were partitioned into 16 gated components. The Independent+Learner" methods use a "blind" control network (FC→ReLU→FC) that maps the control parameters u to gate vectors g for each gated module. Results are shown for the $C2^2_{dist}$ complexity penalty (formula 8) and λ=10 in CHARTS 600A, 600B, 600C of FIG. 6.

Results

The most noticeable result is that nested gating substantially outperformed all variations on the independent method for all 3 architectures (FIG. 6). The difference is especially pronounced for VGG; this may be attributed to VGG learning more "entangled" representations than architectures with skip connections, which could make it more sensitive to exactly which components are gated off. For independent gating, the learned gating controllers were consistently better than random gating for both REINFORCE and Concrete training methods. The learned controllers achieve better performance by allocating computation non-uniformly across the different stages of the network (FIG. 8). Note that the learned gating functions do not cover the entire range of possible utilization [0; 1]. The useful range of u was larger for larger and for complexity penalties with p=1, but these also resulted in lower accuracy overall.

Image Classification: ImageNet

Experiments also examined image classification on the larger-scale ImageNet dataset using the DenseNet-169, ResNeXt-50, and ResNet-50 architectures. For ImageNet, pre-trained weights were used to initialize the data path, then the weights were fine-tuned with gating. The DenseNet-169 and ResNet-50 models from the torchvision package of PyTorch were used, and for ResNeXt-50 the original Torch model was converted to PyTorch using a conversion utility. In these experiments, widthwise nested gating ("WN" in chart 700A of FIG. 7) and depthwise nested gating ("DN") were considered. In the DN scheme, the stages of the ResNet network were iterated from output to input and turn on one additional layer in each stage, unless the proportion of active layers in that stage exceeds u, and stop when the total utilization exceeds u. The "-T" suffix in the figures indicates that fine-tuning with gating was applied.

Results

The throttleable models reached a peak accuracy within about 2-3% of the corresponding pre-trained model, and all were smoothly throttleable through the full range of utilization whereas the pre-trained models degrade rapidly with increased throttling. The ResNeXt model was best in terms of both peak accuracy and area-under-curve.

Object Detection

Throttleable NNs were studied for the PASCAL VOC 2007 object detection task. To create a throttleable object detector, the Faster RCNN framework was modified to replace the "backbone" CNN with a throttleable network. The DenseNet-169 and ResNeXt-50 models were used in this experiment. To combine ResNet with Faster RCNN, the models were split after the layer with a 16×16 pixel receptive field, using the first half of the network as the feature representation, and the second half as the classifier. The naïve models are trained on Imagenet and then fine-tuned on VOC2007, with no gating during training. The throttleable models take the throttleable networks from the ImageNet experiments and fine-tune them on VOC2007 with gating.

Results

Similar to results on image classification, chart 700B of FIG. 7 shows that the baseline method achieves higher peak MAP, but its performance quickly drops when any gating is applied. The throttleable models have lower peak MAP but degrade more gracefully. Interestingly, performance of the throttleable models peaks around u=0:5-0:75 and then degrades as u→1. This was observed to a lesser extent in some of the classification experiments, most notably with VGG in CIFAR10. It may be that the modules that are only active when u>0:75 receive inadequate training because they are active less often. The result might be improved by altering the distribution of u during training to sample values closer to 1 more frequently.

In addition to the above applications, the throttleable neural network techniques described in this disclosure can be applied in the fields of language processing, autonomous decision-making, audio recognition, social network filtering, machine translation, computer vision, drug design, bioinformatics, material inspection, autonomous vehicle, unmanned aerial vehicles, surveillance, cloud computing, and/or other technical field or application. The techniques may be particularly advantageous in those fields or applications in which it is useful to conserve resources for, e.g., power consumption reduction or other resource cost savings, or to increase the speed of computation.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable storage medium may cause a programmable processor, or other processor, to perform the method, e.g., when the instructions are executed. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer readable media.

What is claimed is:

1. A computing system to provide a runtime-throttleable neural network, comprising:
   a neural network comprising a plurality of components, each of the components comprising one or more computational elements of the neural network;
   a uniform neural network model having respective sets of parameters for all of the components of the neural network;
   a gating module having a gating function configured to select components of the neural network to deactivate based on one or more control parameters; and a computation engine comprising processing circuitry,
wherein the computation engine is configured to execute the gating module to selectively deactivate, based on the one or more control parameters, by applying the gating function, one or more of the plurality of components to produce a modified neural network that includes active components of the plurality of components and does not include the deactivated components of the plurality of components to throttle an amount of resources used to perform prediction,
wherein the computation engine is configured to execute, with the respective sets of parameters of the uniform neural network model for the active components, the active components of the modified neural network to process input data to generate output data for the input data, and
wherein the computation engine is configured to output the output data for the input data.

2. The computing system of claim 1,
wherein the neural network comprises a layer having a set of components from the plurality of components, and
wherein to selectively deactivate components of the neural network, the computation engine is configured to selectively deactivate components from the set of components in the layer.

3. The computing system of claim 1,
where the plurality of components comprises respective neural network layers, and
wherein to selectively deactivate components of the neural network, the computation engine is configured to selectively deactivate neural network layers of the neural network layers.

4. The computing system of claim 1,
wherein each of the plurality of components comprises one of a neural network layer or a convolutional filter.

5. The computing system of claim 1,
wherein the gating function is a static gating function in which the one or more control parameters determines a number of gated components, and
wherein a set of one or more rules for the gating function indicates the active components of the one or more control parameters.

6. The computing system of claim 1,
wherein the gating function is a learned gating function having a gating neural network model trained to optimize a combined loss function having a task loss component and a complexity loss component, the complexity loss component being constrained by the one or more control parameters.

7. The computing system of claim 1, wherein the one or more control parameters comprise a single utilization value.

8. The computing system of claim 1,
wherein the gating function uses nested gating to selectively deactivate components of the neural network, and
wherein sets of components from the active components have nested orderings within respective gated modules for different values of the control parameters.

9. The computing system of claim 1,
wherein the gating function uses independent gating to selectively deactivate components of the neural network, and
wherein sets of components from the active components are randomly chosen for different values of the control parameters.

10. The computing system of claim 1,
wherein the gating function is a normalized gating function that normalizes activations of the computations elements of the components to cause outputs from the components to have similar magnitude for different numbers of active components within a gated module having a set of components from the plurality of component.

11. A computing system for training a runtime-throttleable neural network, comprising:
a neural network comprising a plurality of components, each of the components comprising one or more computational elements of the neural network;
a uniform neural network model having respective sets of parameters for the components of the neural network;
a gating module having a gating function configured to select components of the neural network to deactivate based on one or more control parameters; and
a computation engine comprising processing circuitry,
wherein the computation engine is configured to execute the neural network to process first training data to train the uniform neural network model of the neural network over multiple first epochs, wherein for each of the first epochs the computation engine is configured to:
select one or more deactivated components from the components of the neural network to produce a first modified neural network that includes active components of the plurality of components and does not include the deactivated components to throttle an amount of resources used to perform prediction; and
process the first training data using the first modified neural network to train the uniform neural network model to optimize a first loss function.

12. The computing system of claim 11,
wherein the computation engine is configured to execute the gating module to process second training data to train the gating function over multiple second epochs, and
wherein for each of the second epochs the computation engine is configured to:
select values for the one or more control parameters;
select, based on the values for the one or more control parameters, one or more deactivated components from the components of the neural network to produce a second modified neural network that does not include the deactivated components to throttle an amount of resources used to perform prediction; and
process the second training data, with the respective sets of parameters of the uniform neural network model for the active components, using the second modified neural network to train the gating function to optimize a second loss function.

13. The computing system of claim 12,
wherein the second loss function is a combined loss function having a task loss component and a complexity loss component, the complexity loss component being constrained by the one or more control parameters.

14. The computing system of claim 12,
wherein to select the one or more deactivated components from the components of the neural network to produce a second modified neural network, the computation engine is configured to execute the gating module to randomly select, based on the values for the one or more control parameters, deactivated components from the plurality of component.

15. The computing system of claim 12,
wherein to select the one or more deactivated components from the components of the neural network to produce a second modified neural network, the computation engine is configured to execute the gating module to select, based on the values for the one or more control parameters, deactivated components from the plurality of components using nested gating, and
wherein sets of components from the active components have nested orderings within respective gated modules for different values of the control parameters.

16. The computing system of claim 12,
wherein, to process the second training data, the computation engine is configured to hold the respective sets of parameters of the uniform neural network model for the components fixed for each of the second epochs.

17. The computing system of claim 11,
wherein, to process the first training data to train the uniform neural network model of the neural network over multiple first epochs, the computation engine performs backpropagation to optimize the first loss function.

18. A method for training a throttleable neural network, comprising:
selecting, by a gating module having a gating function and executed by a computing system, components from a plurality of components of a neural network to deactivate based on one or more control parameters, each of the components comprising one or more computational elements of the neural network; and
processing, with the neural network executed by the computing system, first training data to train the uniform neural network model of the neural network over multiple first epochs, wherein the uniform neural network module has respective sets of parameters for the components of the neural network, each of the first epochs including the steps of:
selecting one or more deactivated components from the components of the neural network to produce a first modified neural network that includes active components of the neural network and does not include the deactivated components to throttle an amount of resources used to perform prediction; and
processing the first training data using the first modified neural network to train the uniform neural network model to optimize a first loss function.

19. The method of claim 18, further comprising:
processing, by the gating module, second training data to train the gating function over multiple second epochs, each of the second epochs including the steps of:
selecting values for the one or more control parameters;
selecting, based on the values for the one or more control parameters, one or more deactivated components from the components of the neural network to produce a second modified neural network that does not include the deactivated components to throttle an amount of resources used to perform prediction; and
processing the second training data, with the respective sets of parameters of the uniform neural network model for the active components, using the second modified neural network to train the gating function to optimize a second loss function.

20. The method of claim 19,
wherein the second loss function is a combined loss function having a task loss component and a complexity loss component, the complexity loss component being constrained by the one or more control parameters.

\* \* \* \* \*